(12) United States Patent
Jansen et al.

(10) Patent No.: US 11,475,236 B2
(45) Date of Patent: Oct. 18, 2022

(54) MINIMUM-EXAMPLE/MAXIMUM-BATCH ENTROPY-BASED CLUSTERING WITH NEURAL NETWORKS

(71) Applicant: Google LLC, Mountain View, CA (US)

(72) Inventors: Aren Jansen, Mountain View, CA (US); Ryan Michael Rifkin, Oakland, CA (US); Daniel Ellis, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 237 days.

(21) Appl. No.: 16/880,456

(22) Filed: May 21, 2020

(65) Prior Publication Data

US 2020/0372295 A1 Nov. 26, 2020

Related U.S. Application Data

(60) Provisional application No. 63/028,120, filed on May 21, 2020, provisional application No. 62/851,483, filed on May 22, 2019.

(51) Int. Cl.
*G06K 9/62* (2022.01)
*G06N 20/00* (2019.01)
*G06N 3/04* (2006.01)

(52) U.S. Cl.
CPC ......... *G06K 9/6226* (2013.01); *G06K 9/6223* (2013.01); *G06K 9/6239* (2013.01);
(Continued)

(58) Field of Classification Search
CPC .. G06K 9/6226; G06K 9/6223; G06K 9/6239; G06K 9/6259; G06N 20/00; G06N 3/0454
See application file for complete search history.

(56) References Cited

U.S. PATENT DOCUMENTS 11,348,032 B1 * 5/2022 Van Gael ............... G06N 20/00
2019/0303709 A1 * 10/2019 Hu ....................... G06N 3/0445
(Continued)

OTHER PUBLICATIONS

Arora et al., "Deep Embeddings for Rare Audio Event Detection with Imbalanced Date", IEEE International Conference on Acoustics, Speech, and Signal Processing, Brighton, UK, May 12-17, 2019, 5 pages.
(Continued)

*Primary Examiner* — Christopher M Brandt
(74) *Attorney, Agent, or Firm* — Dority & Manning, P.A.

(57) ABSTRACT

A computing system can include an embedding model and a clustering model. The computing system input each of the plurality of inputs into the embedding model and receiving respective embeddings for the plurality of inputs as outputs of the embedding model. The computing system can input the respective embeddings for the plurality of inputs into the clustering model and receiving respective cluster assignments for the plurality of inputs as outputs of the clustering model. The computing system can evaluate a clustering loss function that evaluates a first average, across the plurality of inputs, of a respective first entropy of each respective probability distribution; and a second entropy of a second average of the probability distributions for the plurality of inputs. The computing system can modify parameter(s) of one or both of the clustering model and the embedding model based on the clustering loss function.

16 Claims, 8 Drawing Sheets

(52) U.S. Cl.
CPC ........... *G06K 9/6259* (2013.01); *G06N 20/00* (2019.01); *G06N 3/0454* (2013.01)

(56) References Cited

U.S. PATENT DOCUMENTS

2020/0074280 A1* 3/2020 Meier ..................... G06V 10/82
2020/0153776 A1* 5/2020 Qiu ....................... H04L 51/226

OTHER PUBLICATIONS

Xie et al., "Unsupervised Deep Embeddings for Clustering Analysis", Proceedings of the 33$^{rd}$ International Conference on Machine Learning, New York New York, 2016, 10 pages.

* cited by examiner

US 11,475,236 B2

MINIMUM-EXAMPLE/MAXIMUM-BATCH ENTROPY-BASED CLUSTERING WITH NEURAL NETWORKS

CROSS-REFERENCE TO RELATED APPLICATIONS

The present application claims benefit of U.S. Provisional Patent Application Ser. No. 62/851,483, having a filing date of May 22, 2019, and claims benefit of U.S. Provisional Patent Application Ser. No. 63/028,120, having a filing date of May 21, 2020, each of which are incorporated herein by reference in its entirety.

FIELD

The present disclosure relates generally to performing clustering using machine-learning. More particularly, the present disclosure relates to systems and methods for training a clustering and/or embedding model.

BACKGROUND

Clustering is a common operation in machine learning and data analysis. Traditional clustering algorithms, of which there are many, are applied outside deep learning systems in a predefined representation space. Most clustering algorithms rest on the premise that natural datasets consists of a collection of discernible distributional modes (i.e., the clusters) in some high dimensional space. Conventional clustering algorithms also typically employ a hard encoding of input datapoints to clusters. Such clustering algorithms suffer various drawbacks. For example, they are not always satisfactory for complex data sets and/or can require substantial manual adjustment or tuning to be adapted for different situations. Further, prior art neural network-based clustering methods generally depend on external clustering in a pre-existing embedding space to seed a clustering objective, which is then reinforced.

SUMMARY

Aspects and advantages of embodiments of the present disclosure will be set forth in part in the following description, or can be learned from the description, or can be learned through practice of the embodiments.

One example aspect of the present disclosure is directed to a computing system including one or more processors and an embedding model configured to receive each of a plurality of inputs and to respectively process each input to produce a respective embedding. The computing system may include a clustering model configured to receive the respective embedding for each input and to respectively process the respective embedding for each input to produce a respective cluster assignment for each input. The respective cluster assignment for each input can include a respective probability distribution for the respective embedding with respect to a plurality of clusters. The computing system can include one or more non-transitory computer-readable media that collectively store instructions that, when executed by the one or more processors, cause the computing system to perform operations. The operations may include inputting each of the plurality of inputs into the embedding model; receiving the respective embeddings for the plurality of inputs as outputs of the embedding model; inputting the respective embeddings for the plurality of inputs into the clustering model; receiving the respective cluster assignments for the plurality of inputs as outputs of the clustering model; evaluating a clustering loss function; and modifying one or more parameters of one or both of the clustering model and the embedding model based on the clustering loss function. The clustering loss function can evaluate a first average, across the plurality of inputs, of a respective first entropy of each respective probability distribution and a second entropy of a second average of the probability distributions for the plurality of inputs.

Another example aspect of the present disclosure is directed to a computing system including one or more processors and an embedding model configured to receive each of a plurality of inputs and to respectively process each input to produce a respective embedding. The computing system can include a clustering model configured to receive the respective embedding for each input and to respectively process the respective embedding for each input to produce a respective cluster assignment for each input. The respective cluster assignment for each input can include a respective probability distribution for the respective embedding with respect to a plurality of clusters. At least one of the embedding model or the clustering model can have been trained based on a clustering loss function. The clustering loss function can include a first average, across the plurality of inputs, of a respective first entropy of each respective probability distribution and a second entropy of a second average of the probability distributions for the plurality of inputs. The computing system can include one or more non-transitory computer-readable media that collectively store instructions that, when executed by the one or more processors, cause the computing system to perform operations. The operations can include inputting an additional input into the embedding model and receiving an additional embedding as an output of the embedding model. The additional embedding can be generated by the embedding model by processing the additional input. The operations can include inputting the additional embedding into the clustering model and receiving an additional cluster assignment as an output of the clustering model. The additional cluster assignment can be generated by the clustering model by processing the additional embedding.

Another example aspect of the present disclosure is directed to a method for training one or more machine learned models. The method may include inputting, by one or more computing devices, each of a plurality of inputs into an embedding model that is configured to respectively process each input to produce a respective embedding; receiving, by the one or more computing devices, the respective embeddings for the plurality of inputs as outputs of the embedding model; and inputting, by the one or more computing devices, the embeddings of the plurality of inputs into a clustering model that is configured to receive the respective embedding for each input and to respectively process the respective embedding for each input to produce a respective cluster assignment for each input. The respective cluster assignment for each input can include a respective probability distribution for the respective embedding with respect to a plurality of clusters. The operations can include receiving, by the one or more computing devices, the cluster assignment as an output of the clustering model and evaluating, by the one or more computing devices, a clustering loss function. The clustering loss function can include a mean per-example entropy that includes a first average, across the plurality of inputs, of a respective entropy of each respective probability distribution and a batch average distribution entropy of a second average of the probability distributions for the plurality of inputs. The method can include modifying, by the one or more computing devices, parameters of at least one of the clustering model or the embedding model based on the clustering loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a pan of this specification, illustrate example embodiments of the present disclosure and, together with the description, serve to explain the related principles.

BRIEF DESCRIPTION OF THE DRAWINGS

Example drawings are attached. A brief description of the drawings is provided below.

Figure 1A:
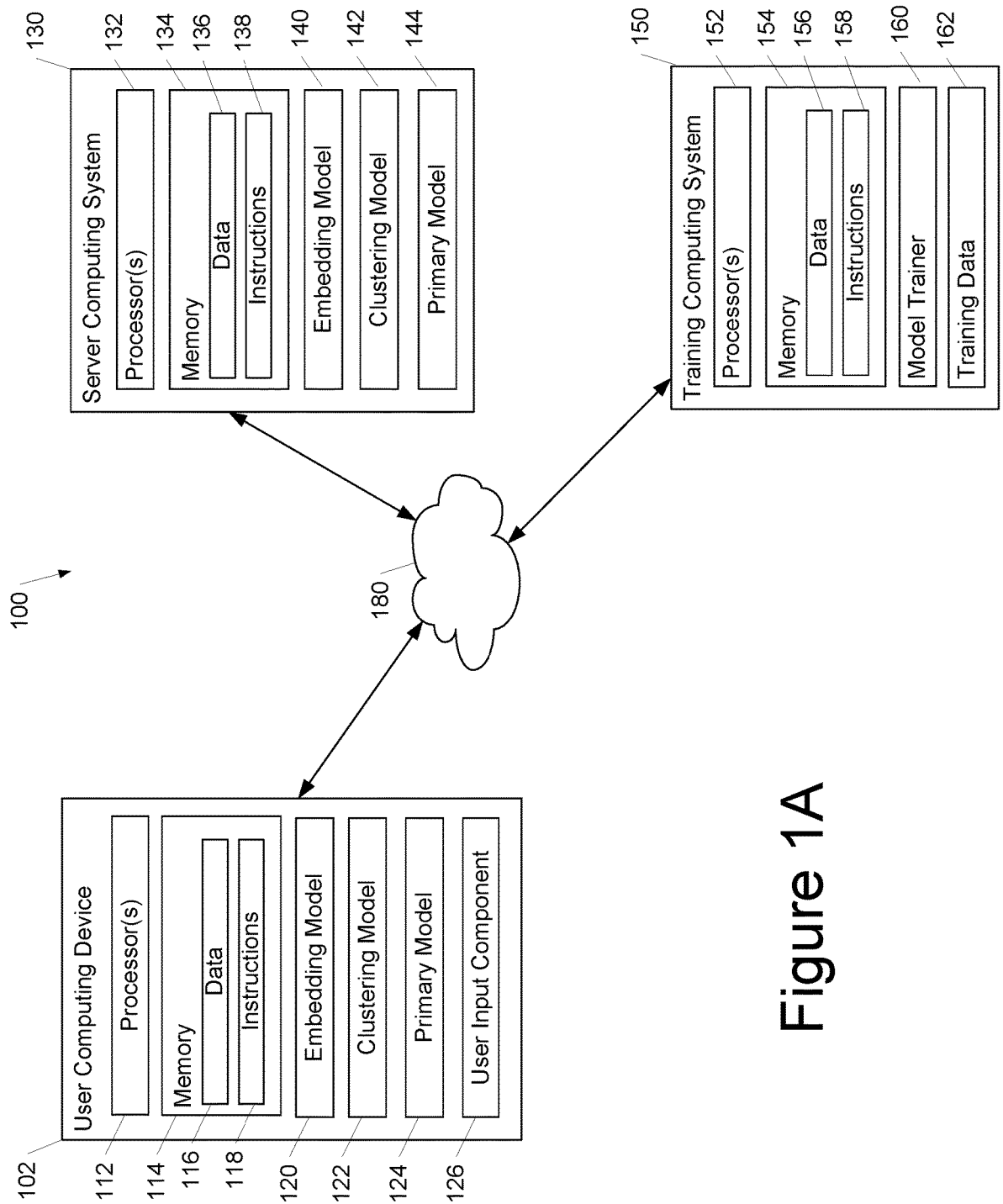
FIG. 1A depicts a block diagram of an example computing system for training an embedding model and/or a clustering model based on a clustering loss function according to example embodiments of the present disclosure.

Reference numerals that are repeated across plural figures are intended to identify the same features in various implementations.

DETAILED DESCRIPTION

Overview

Generally, the present disclosure is directed to systems and methods for training a clustering and/or embedding model. Clustering is generally used to group input data into multiple clusters such that similar data points are grouped together and dissimilar data points are separated. Example input data include images, video, audio, statistics, etc.

In particular, aspects of the present disclosure are directed to training a machine-learned embedding model and/or a machine-learned clustering model using a clustering loss function. The clustering loss function can be configured to balance two competing objectives. First, the clustering loss function can be configured to seek to produce confident assignments of input data elements to clusters. The clustering loss function can balance this first objective with a second objective that prevents a trivial solution, in which all elements of the input data are mapped to a single cluster. Thus, the clustering loss function can encourage each input to be confidently assigned to one of the clusters, but also encourage mapping of the input data points across multiple clusters.

This configuration can be used to train the embedding model and/or clustering model in an unsupervised fashion and without requiring seeding using a pre-existing embedding. As such, the model(s) can be effectively trained using unlabeled data for particular applications or problem domains, which improves performance and adaptability of the models as compared with prior art methods. Furthermore, the models can facilitate the discovery of natural partitions or clusters in the data without requiring a pre-existing embedding to seed the clustering objective. As a result, such models can be more effectively trained to cluster complex data with less manual human intervention (e.g., labeling, selecting a pre-existing embedding, etc.).

More particularly, clustering and/or embedding models according to the present disclosure can be used to group a variety of types of input data. For example, the clustering and/or embedding models can be used to categorize, recognize patterns, or extract features from input data such as images, video, audio, text, statistics, or any other suitable type of structured data.

The embedding model can be configured to receive a plurality of inputs and to respectively process each input to produce a respective embedding. In some implementations, an embedding can be a mapping of discrete inputs to continuous vectors or tensors of real numbers (e.g., weights) in a representational space. Embeddings can describe or represent features or patterns within the inputs. Many machine-learned models configured to categorize or recognize patterns in data employ embeddings (e.g., as hidden layers). Examples of such models include object recognition and classification models for images, videos, audio, etc. For instance, an embedding of an object recognition model can represent features, such as vertical stripes, dots, swirls, or other visual patterns (e.g., including non-humanly interpretable features), in image data.

The clustering model can be configured to receive the embedding for each input and to respectively process the respective embedding for each input to produce a respective cluster assignment for each input. The respective cluster assignment for each input can include a respective probability distribution for the respective embedding with respect to a plurality of clusters. Each probability distribution for a respective input element can describe respective probabilities (e.g., confidences) for the respective element belonging in each of the clusters. In other words, the respective cluster assignment can probabilistically map (e.g., soft-encode) each input to the plurality of clusters. As such, the cluster assignments can identify-similarities between various inputs or input elements, such as similar objects or features within images, similar sounds within audio, and/or correlations between statistical data points.

As indicated above, the clustering loss function can facilitate such training of the machine-learned embedding model and/or a machine-learned clustering model. More particularly, the clustering loss function can evaluate satisfaction of the first objective (encouraging confident mappings) by evaluating a first average, across the plurality of inputs, of a respective first entropy of each respective probability distribution (e.g., a "mean per-example entropy"). The clustering loss function can evaluate satisfaction of the second objective (encouraging diversity of cluster assignments) by evaluating a second entropy of a second average of the probability distributions for the plurality of inputs (e.g., an "entropy of a batch average distribution"). Thus, the clustering loss function can be used to train the models to produce non-trivial and confident clustering assignments in an unsupervised fashion.

The computing system can modify parameters of one or both of the clustering model and the machine-learned embedding model based on the clustering loss function such that the models can be effectively trained for specific applications in an unsupervised manner without labeled data. More specifically, the presently disclosed clustering loss function can facilitate the discovery of natural partitions or clusters in the data without requiring a pre-existing embedding to seed the clustering objective. This can be particularly useful for effectively training a model to cluster complex, unlabeled data sets. Such data sets are increasingly common and can include large groups of unlabeled images, audio files, bodies of text, statistics, etc.

The computing system can backpropagate the clustering loss function through the clustering model, to modify the parameters (e.g., weights) the clustering model. The computing system can continue to backpropagate the clustering loss function through the embedding model, with or without modification of the parameters (e.g., weights) of the embedding model. For instance, the computing system can perform a gradient descent technique in which parameters of the models can be modified in a direction of a negative gradient of the clustering loss function. Thus, in some embodiments, the computing system can modify parameters of the clustering model based on the clustering loss function without modifying parameters of the embedding model. In other embodiments, however, parameters of the embedding model can be modified based on the clustering loss function without modifying parameters of the clustering model. In yet further embodiments, respective parameters of each of the embedding model and clustering model can be modified based on the clustering loss function.

In some implementations, one or more components of the clustering loss function can be scaled by respective hyperparameters. For example, the second entropy can be scaled by a diversity hyperparameter. The diversity hyperparameter can be used to adjust the relative effects of the clustering loss function terms that respectively promote the two objectives. As such, the diversity hyperparameter can be used to adjust or tune the loss provided by the clustering loss function and the resulting behavior of the models trained based on the clustering loss function (e.g., the machine-learned embedding model and/or the clustering model). The diversity hyperparameter can be selected to produce the desired balance between the first objective of minimizing the average entropy of the input data points and the second objective of preventing collapse of the mapping produced by the clustering model into the trivial solution in which all inputs are mapped to a single cluster.

In other implementations, one or more components of the clustering loss function can be scaled by a learned diversity weight or parameter. For example, iterative steps of training and evaluating can be used to optimize the diversity hyperparameter that controls a balance between the first and second objectives described above. Thus, the diversity weight can be learned to further improve training of the model.

In some implementations, the cluster assignments that describe the mapping of the embedding with respect to the plurality of clusters can describe respective centroids of the plurality of clusters. For example, the clusters can be mathematically defined based on their respective centroids in a multi-dimensional space. In other implementations, the cluster assignments that describe the mapping of the embedding with respect to the plurality of clusters do not refer to or require computation of cluster centroids.

In some implementations, the computing system can further include a machine-learned primary model, and the embedding model can be implemented as a pre-processor of the inputs for the machine-learned primary model. The machine-learned primary model can be configured for a variety of tasks or applications, such as image classification, audio classification, speech recognition, object recognition, personal assistant applications, and/or any other suitable application for machine-learned models. The embedding model can be trained to produce embeddings that are useful as inputs to the machine-learned primary model. For example, the computing system can be configured to receive the embedding as an output of the machine-learned embedding model. In response to receiving the embedding, the machine-learned primary model can output a primary output (e.g., a classification output, a recognition output, or other suitable output according to the purpose of the machine-learned primary model). The computing system can modify parameters of the machine-learned embedding model based on a primary loss function evaluated with respect to the primary output of the machine-learned primary model.

In some implementations, the machine-learned embedding model can be trained in multiple stages. For example, in a first training stage, the machine-learned embedding model can be trained based on the clustering loss function (e.g., using a large set of unlabeled training data). In a second training stage, the machine-learned embedding model can be trained based on the primary loss function that is evaluated with respect to the primary output of the machine-learned primary model (e.g., using a smaller set of labeled training data). The primary loss function can be selected or configured such that the machine-learned embedding model is trained to produce embeddings that are useful as inputs to the machine-learned primary model. For instance, the embeddings can describe features or patterns within the input data that can be useful as inputs to the primary model (e.g., an object recognition model).

In some implementations, the output of the machine-learned embedding model can be useful as an output of the system. At an inference time, the computing system can input an additional input into the machine-learned embedding model and receive additional embeddings as an output of the machine-learned embedding model. For example, the additional input can include images, text, videos, audio, etc. The additional embeddings received as an output of the machine-learned embedding model can describe features or other information about the additional input. In one example, the additional embedding(s) can be used to perform a similarity search for the additional input(s). For example, a distance (e.g., an L2 norm) between respective embeddings for two inputs can be indicative of a similarity of the two inputs (e.g., smaller distance indicates higher similarity).

In some implementations, a computing system can include an embedding model and clustering model in which at least one of the embedding model or the clustering model has been trained based on a clustering loss function as described herein. An additional input can be input into the embedding model and an additional embedding can be received as output of the embedding model. The additional embedding can be into the clustering model and an additional cluster assignment can be received as an output of the clustering model. The additional output of the clustering model can be used as an output of the computing system. For instance, the additional output of the clustering model can include clustering assignments with respect to the additional input.

In some implementations, the embedding model can be or include an identity map (e.g., a fixed, precomputed input representation). In such implementations, the embedding model may be free of a neural network. Parameters of the clustering model may still be adjusted as described herein to train the clustering model.

The systems and methods of the present disclosure provide a number of technical effects and benefits. For example, implementations described herein can be used to train the models to learn useful relationships among input data elements, for example as described by the embeddings or the cluster assignment, in an unsupervised manner. Furthermore, implementations described herein can eliminate the need for external clustering in a pre-existing embedding space to seed a clustering objective. Thus, the models can be trained more efficiently (using fewer computational resources, requiring less manual adjustment/tuning) according to the present disclosure as compared with prior art methods. Thus, the models can be more effective and efficiently trained and adapted to complex data sets or problem domains than prior art clustering methods. For example, this can improve training of models for classification and/or recognition with respect to images, video, audio, etc.

Additionally, in some implementations, the embedding model may be used in combination with a primary model that has been trained to perform a specific task (e.g., a non-clustering task). Employing the embedding model in this configuration can reduce the amount of training iterations for the primary model as compared with inputting raw input data into the primary model. Thus, the systems and method disclosed herein may reduce the computational resources required for training machine-learned models to perform a specific technical task, such as recognition and/or classification of images, video, audio, etc.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 for training one or more machine learned models according to example embodiments of the present disclosure. The system 100 can include a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof The memory 114 can store data 116 and instructions 118 which are executed by the processor 112 to cause the user computing device 102 to perform operations.

The user computing device 102 can store or include one or more embedding model 120, clustering model 122, and/or primary model 124. For example, one or more of the embedding model 120, clustering model 122, and primary model 124 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example models 120, 122, 124 are discussed with reference to FIGS. 2 through 5.

In some implementations, the one or more of the embedding model 120, clustering model 122, and primary model 124 can be received from the server computing system 130 over network 180, stored in the user computing device memory 114, and the used or otherwise implemented by the one or more processors 112. In some implementations, the user computing device 102 can implement multiple parallel instances of a single embedding model 120, clustering model 122, and/or primary model 124 (e.g., to perform parallel operations, such as clustering, across multiple instances of the models).

Additionally or alternatively, one or more of the embedding model 140, clustering model 142, and primary model 144 can be included in or otherwise stored and implemented by the server computing system 130 that communicates with the user computing device 102 according to a client-server relationship. For example, one or more of the models 140, 142, 144 can be implemented by the server computing system 140 as a portion of a web service. Thus, one or more models 120, 122, 124 can be stored and implemented at the user computing device 102 and/or one or more models 140, 142, 144 can be stored and implemented at the server computing system 130.

The user computing device 102 can also include one or more user input components 126 that receives user input. For example, the user input component 126 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more models 140, 142, 144. For example, the models 140, 142, 144 can be or can otherwise include various machine-learned models such as neural networks (e.g., deep recurrent neural networks) or other multi-layer non-linear models. Example models 140, 142, 144 are discussed with reference to FIGS. 2 through 5.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train one or more of the model 140, 142, 144 based on a set of training data 162, for example in an unsupervised fashion. The training data 162 can include, for example, unlabeled sets of images, video, audio, statistics, etc. The model trainer 160 can train one or more of the model 140, 142, 144 using the method described below with respect to FIG. 6.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
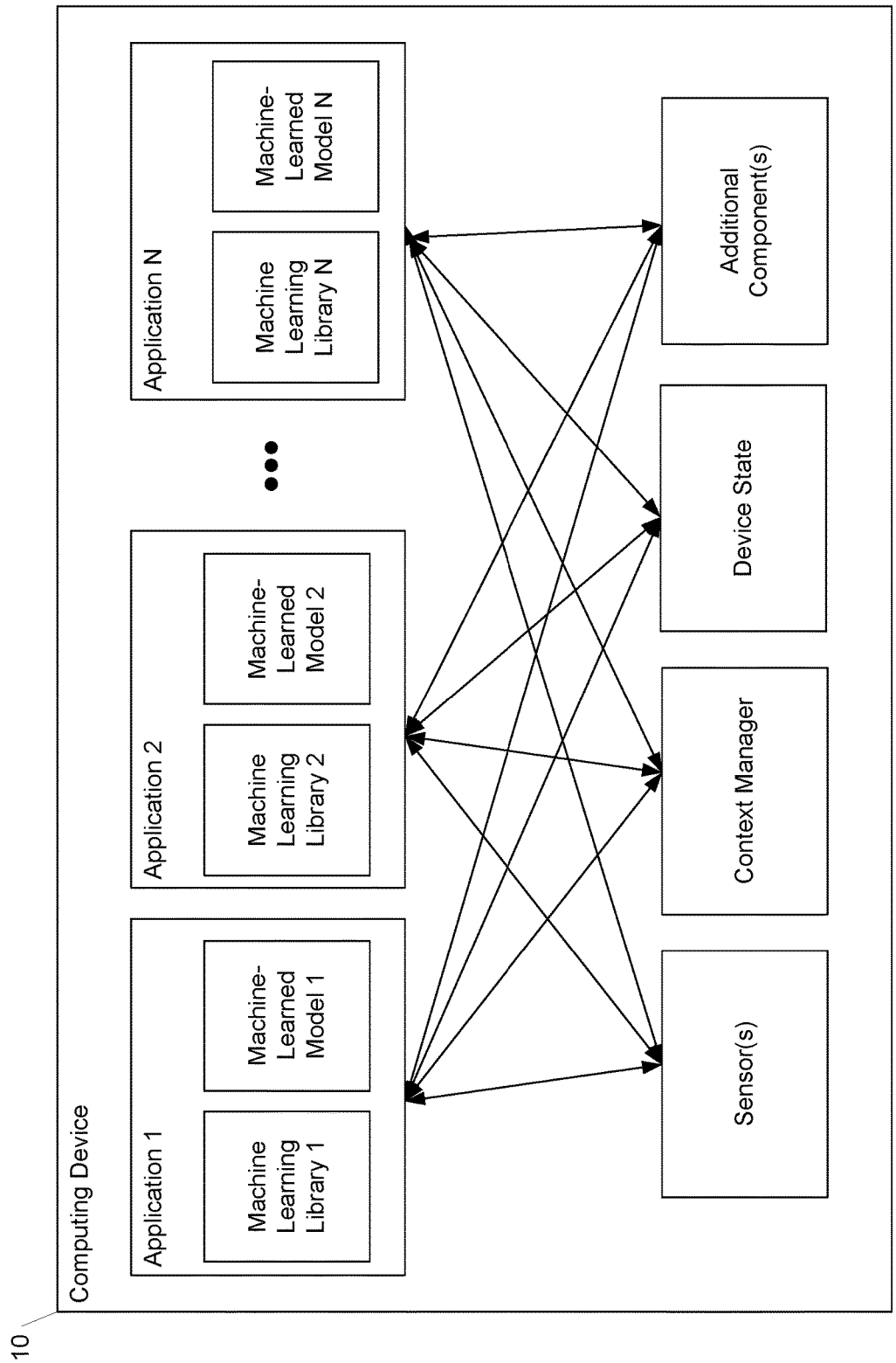
FIG. 1B depicts a block diagram an example computing system for training an embedding model and/or a clustering model based on a clustering loss function according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
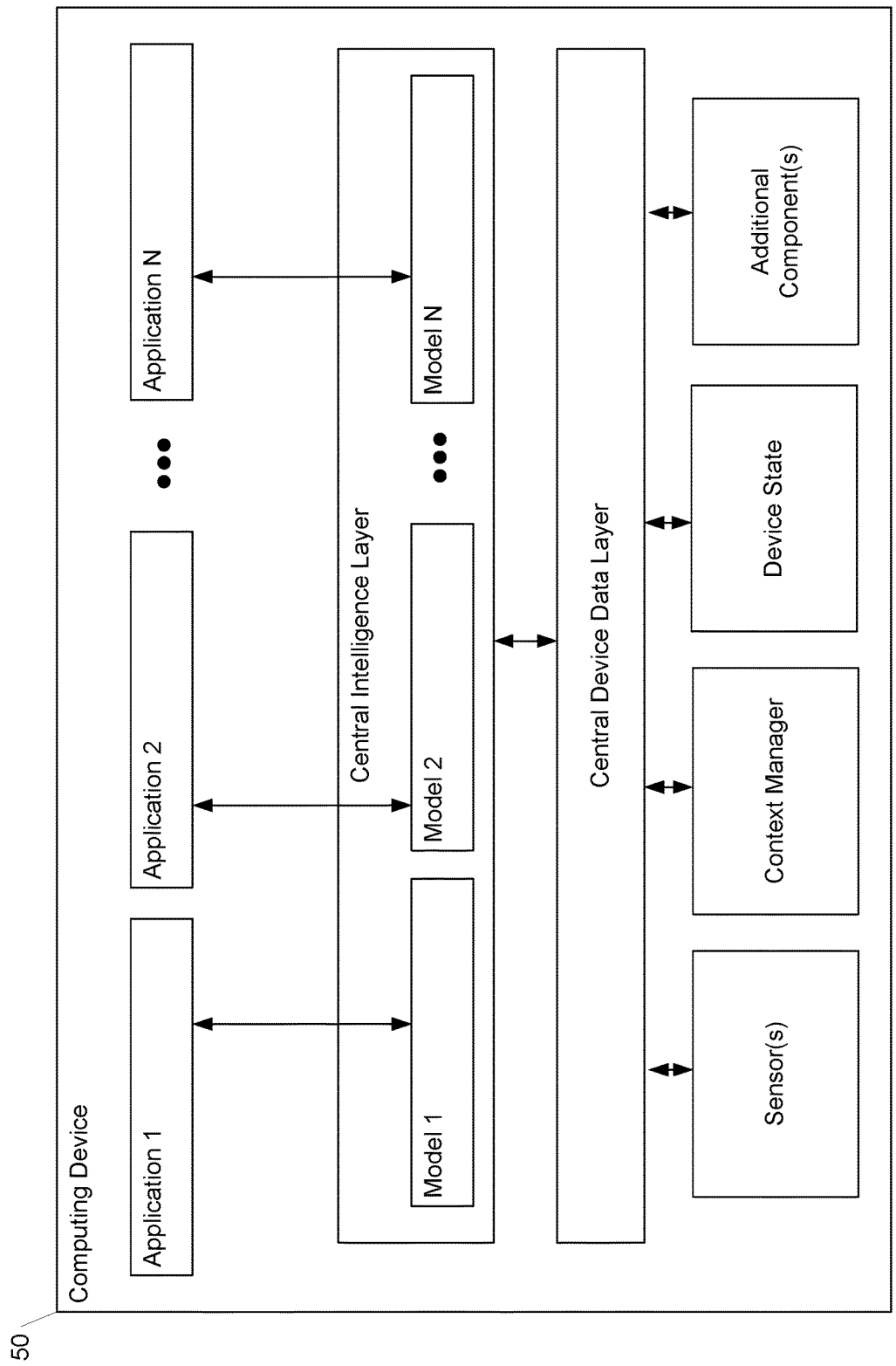
FIG. 1C depicts a block diagram of an example computing system for training an embedding model and/or a clustering model based on a clustering loss function according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in Figure IC, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
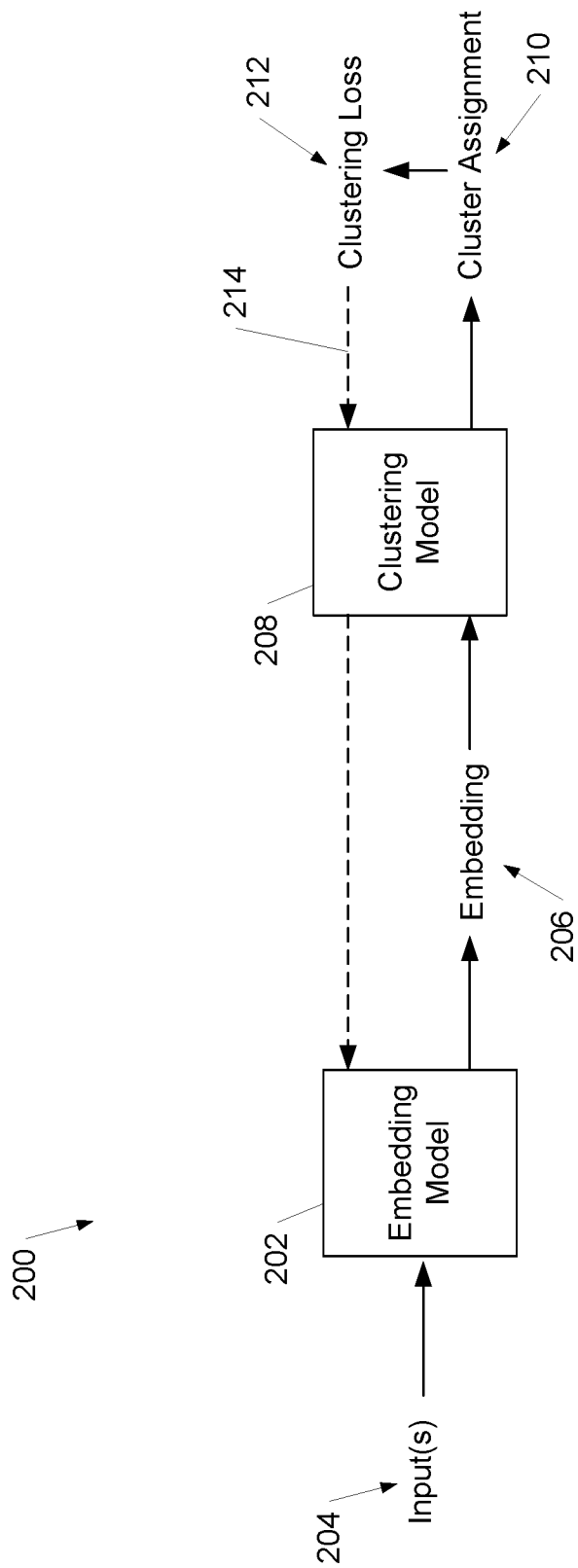
FIG. 2 depicts a block diagram of a computing system configured to train one or more of an embedding model and a clustering model based on a clustering loss according to example embodiments of the present disclosure.

FIG. 2 depicts a block diagram of an training configuration 200 for an embedding model 202 and clustering model 208 based on a clustering loss 212 provided by a clustering loss function according to example embodiments of the present disclosure.

The clustering model 208 and/or the embedding model 202 can be used to cluster, or group, a variety of types of input data 204. For example, the clustering and/or embedding models can be used to group the input data 204 or recognize patterns within the input data 204. As example, the input data 204 can include images, video, audio, statistics, or any other suitable type of structured data.

In some implementations, the machine-learned embedding model 202 can be configured to receive a plurality of inputs 204 and to respectively process each input 204 to produce respective embeddings 206. An embedding 206 is a mapping of the (discrete) inputs 204 to continuous vectors or tensors of real numbers (e.g., weights) in a representational space. Embeddings can describe or represent features or patterns within the inputs 204. Many machine-learned models configured to categorize or recognize patterns in data employ embeddings (e.g., as hidden layers). Examples of such models include object recognition and classification models for images, videos, audio, etc. For instance, an embedding of an object recognition model can represent features in image data, such as vertical stripes, dots, swirls, or other visual patterns.

The clustering model 208 can be configured to receive and process the respective embedding 206 for each input 204 to produce a respective cluster assignment 210 for each input 204. The respective cluster assignments 210 can each include a respective probability distribution for the respective embedding 206 with respect to a plurality of clusters. For example, the respective cluster assignment 210 for each input 204 can include an encoding of respective elements of the input 204 with respect to one or more of the plurality of clusters. Each probability distribution for a respective element of input(s) 204 can describe respective probabilities (e.g., confidences) for the respective element of input(s) 204 belonging in each of the clusters. In other words, the respective cluster assignment 210 can probabilistically map (e.g., soft-encode) each element of the input(s) 204 to the plurality of clusters. As such, the cluster assignments 210 can identify similarities between various inputs 204 or elements of the inputs 204, such as similar objects or features within images, similar sounds within audio, and/or correlations between statistical data points.

In some implementations, the cluster assignments 210 can describe respective centroids of the plurality of clusters. For example, the clustering assignments 210 can be mathematically defined based on their respective centroids in a multi-dimensional space.

The computing system can evaluate a clustering loss 212 provided by a clustering loss function. As indicated above, the clustering loss function can facilitate training of the machine-learned embedding model 202 and/or a machine-learned clustering model 208. More particularly, the clustering loss function can be configured to balance two competing objectives. First, the clustering loss function can be configured to seek to produce confident assignments of the elements of the input 204 to clusters. The clustering loss function can balance this first objective with a second objective that prevents a trivial solution, in which all elements of the input data 204 are mapped to a single cluster. Thus, the clustering loss function can encourage each element of the input 204 to be confidently assigned to one of the clusters in the cluster assignment 210, but also encourage at least some mapping of the elements of the input 204 across multiple clusters in the cluster assignment 210. This configuration can be used to train the embedding model 202 and/or clustering model 208 in an unsupervised fashion and without requiring seeding using a pre-existing embedding. As such, the model(s) 202, 208 can be effectively trained using unlabeled data for particular applications or problem domains, which improves performance and adaptability of the models 202, 208 as compared with prior art methods. Furthermore, the models 202, 208 can facilitate the discovery of natural partitions or clusters in the in elements of the input 204 without requiring a pre-existing embedding to seed the clustering function. As a result, the models 202, 208 can be more effectively trained to cluster complex data with less manual human intervention (e.g., labeling data, selecting/configuring a pre-existing embedding, etc.).

The clustering loss function can represent the first objective (encouraging confident mappings) by evaluating a first average, across the plurality of inputs 204, of a respective first entropy of each respective probability distribution. The clustering loss function can represent the second objective (preventing the trivial solution of all elements of the input 204 from being mapped to a single cluster) by evaluating a second entropy of a second average of the probability distributions for the plurality of inputs 204. Thus, the clustering loss function can be used to train the models 202, 208 to produce non-trivial and confident clustering assignments 210 in an unsupervised fashion.

For instance, in some embodiments, the clustering loss function, $L(X, f, p)$, may be defined as follows:

$$L(X, f, p) = \frac{1}{B}\sum_{i=1}^{B} H[p(f(x_i))] - \eta H\left[\frac{1}{B}\sum_{i=1}^{B} p(f(x_i))\right] \quad (1)$$

in which, B is the plurality of inputs 204, H[p(f (x$_i$)] is a respective first entropy, H, of each respective probability distribution p(f (x$_i$)); η is a diversity hyperparameter; and $$H\left[\frac{1}{B}\sum_{i=1}^{B} p(f(x_i))\right]$$

is a second entropy. The term p(f (x$_i$)) represents the respective probability distributions for each input 204, and H represents entropy.

The first term, $$\frac{1}{B}\sum_{i=1}^{B} H[p(f(x_i))],$$

can be described as a mean per-example entropy. The second term, $$H\left[\frac{1}{B}\sum_{i=1}^{B} p(f(x_i))\right],$$

can be described as an entropy of the batch average distribution. For both terms, the entropy can be calculated over the cluster assignment distribution. Further, the second entropy can be described as the entropy of the average distribution across the batch (or if not using stochastic gradient descent (SGD) methods, an average distribution across the dataset).

The diversity hyperparameter can be used to adjust the relative effects of the clustering entropy and the first average of the respective first entropies. For example, as shown in Equation 1, the second entropy can be scaled by the diversity hyperparameter. As such, the diversity hyperparameter can be used to adjust or tune the clustering loss 212 provided by the clustering loss function and the resulting behavior of the models 202, 208 trained based on the clustering loss function (e.g., the machine-learned embedding model 202 and/or the clustering model 208). The diversity hyperparameter can be selected to produce the desired balance between the first objective of minimizing the average entropy of the input data points and the second objective of preventing collapse of the mapping produced by the clustering model into the trivial solution in which all elements of the input 204 are mapped to a single cluster.

In other implementations, however, one or more components of the clustering loss function can be scaled by a learned diversity weight or parameter. For example, iterative steps of training and evaluating can be used to minimize a diversity loss function that affects a balance between the first and second objectives described above. Thus, the diversity parameter can be learned to further improve training of the model.

The computing system can modifying parameters of one or both of the clustering model 208 and the embedding model 202 based on the clustering loss 212 such that the models 202, 208 can be effectively trained for specific applications in an unsupervised manner without labeled data. More specifically, the presently disclosed clustering loss function can facilitate the discovery of natural partitions or clusters in the data without requiring a pre-existing embedding to seed the clustering objective. This can be particularly useful for learning how to effectively train a model to cluster complex, unlabeled data sets. Such data sets are increasingly common and can include large groups of unlabeled images, audio files, bodies of text, statistics, etc.

The computing system can backpropagate the clustering loss 212 through the clustering model 208 (represented by dotted arrow 214) to modify parameters (e.g., weights) of the clustering model 208. The computing system can continue to backpropagate the clustering loss 212 through the embedding model 202, with or without modification of the parameters (e.g., weights) of the embedding model 202. For instance, the computing system can perform a gradient descent technique in which parameters of one or more of the models 202, 208 can be modified in a direction of a negative gradient of the clustering loss function. Thus, in some embodiments, the computing system can modify parameters of the clustering model 208 based on the clustering loss 212 without modifying parameters of the embedding model 202. In other embodiments, however, parameters of the embedding model 202 can be modified based on the clustering loss 212 without modifying parameters of the clustering model 208. In yet further embodiments, respective parameters of each of the embedding model 202 and clustering model 208 can be modified based on the clustering loss 212.

The systems and methods of the present disclosure provide a number of technical effects and benefits. For example, implementations described herein can be used to train the models 202, 208 to learn useful relationships among elements of input data 204, for example as described by the embeddings 206 or the cluster assignment 210, in an unsupervised manner. Furthermore, implementations described herein can eliminate the need for external clustering in a pre-existing embedding space to seed a clustering objective. Thus, the models 202, 208 can be trained more efficiently (e.g., using fewer computational resources, requiring less manual adjustment/tuning) according to the present disclosure as compared with prior art methods. Thus, the models 202, 208 can be more effective and efficiently trained and adapted to complex data sets or problem domains than prior art clustering methods. For example, this can improve training of models 202, 208 for classification and/or recognition with respect to images, video, audio, etc.

Figure 3:
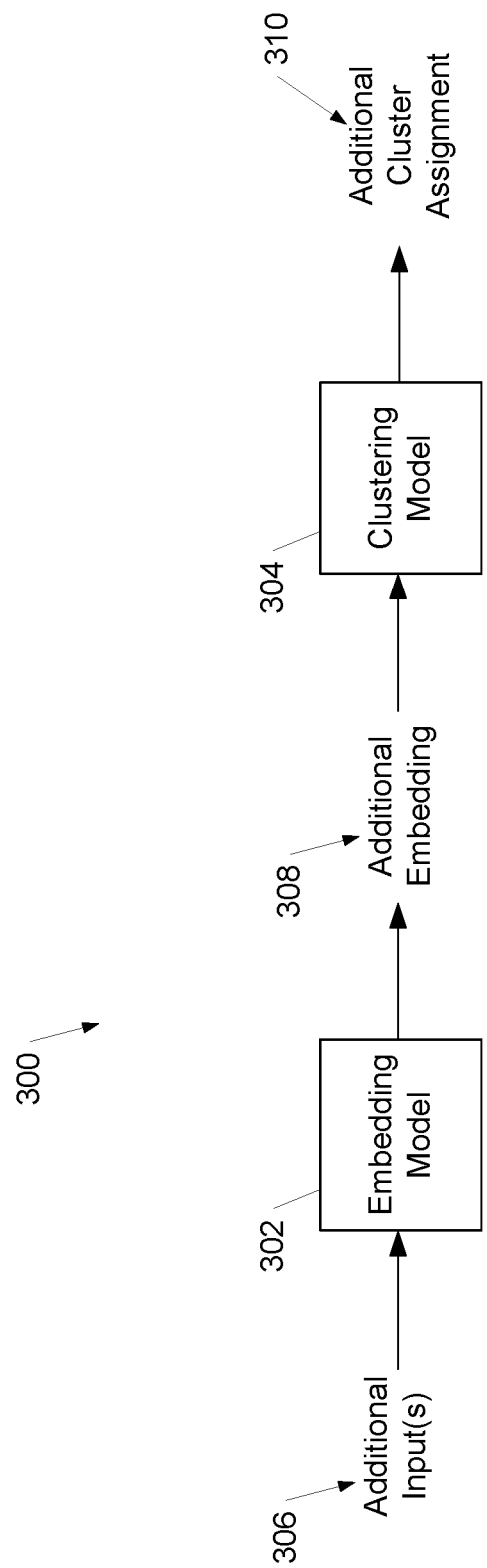
FIG. 3 depicts a block diagram of a computing system including an embedding model and a clustering model that has been trained based on a clustering loss according to example embodiments of the present disclosure.

FIG. 3 depicts a block diagram of an example system 300 including an embedding model 302 and clustering model 304 at an inference time according to example embodiments of the present disclosure. The system 300 can be trained as described above with reference to FIG. 3. As an inference time, the computing system can input each of a plurality of primary or additional inputs 306 into the machine-learned embedding model 302 and receive respective additional embeddings 308 for the plurality of inputs 306 as outputs of the machine-learned embedding model 302. The computing system can input the respective additional embeddings 308 for the plurality of additional inputs 306 into the clustering model 304 and receive the respective additional cluster assignments 310 for the plurality of additional inputs 306 as additional outputs of the clustering model 304. The additional embeddings 308 and/or additional cluster assignment 310 can contain useful information with respect to the additional input(s) 306. For instance, in an object recognition context, the additional embeddings 308 can represent or describe features, such as vertical stripes, dots, swirls, or other visual patterns, in image data.

Figure 4:
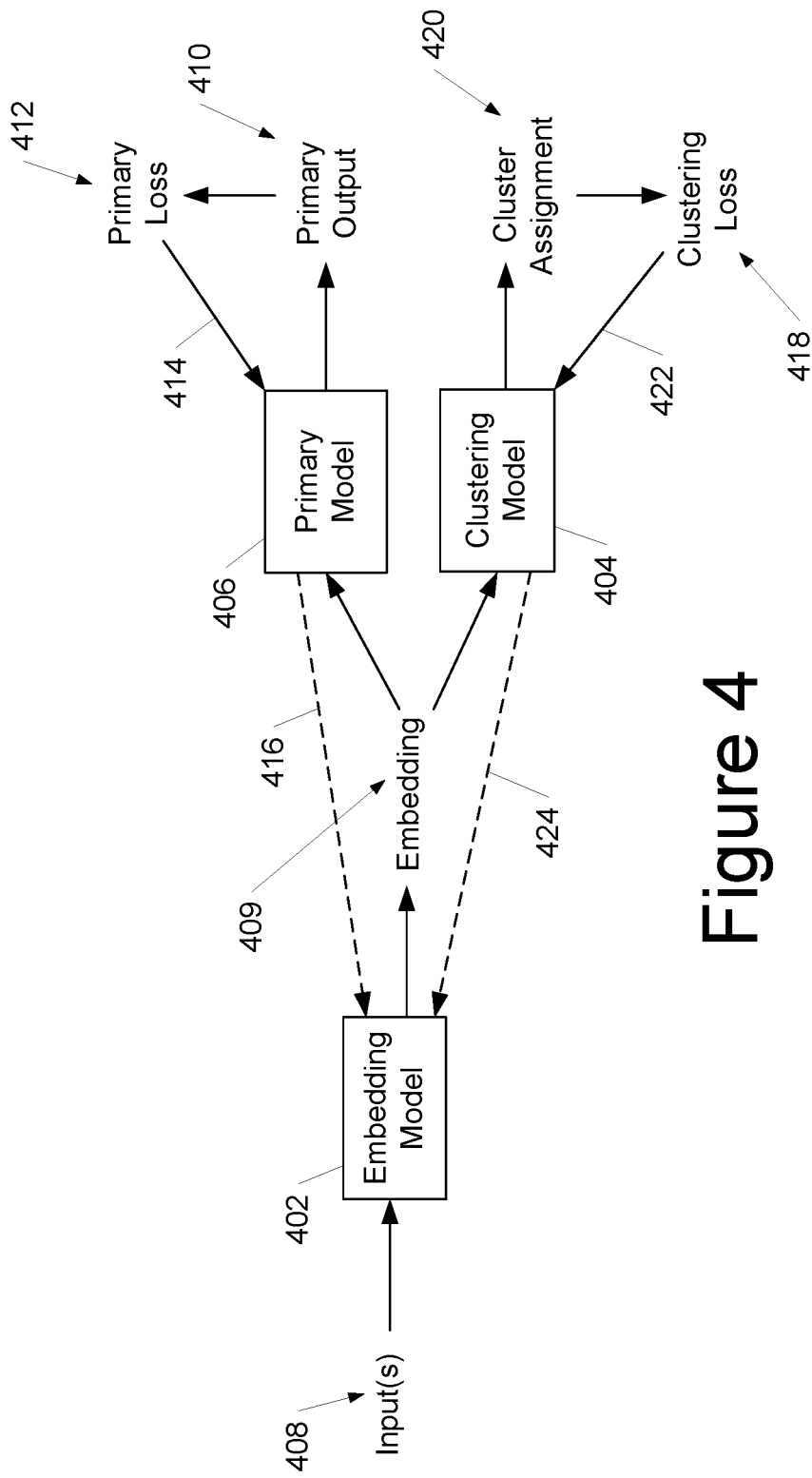
FIG. 4 depicts a block diagram of a computing system including an embedding model, a clustering model, and a primary model in which training is based on a primary loss and a clustering loss according to example embodiments of the present disclosure.

FIG. 4 depicts a block diagram of a training configuration 400 for an embedding model 402, clustering model 404, and a machine-learned primary model 406 according to example embodiments of the present disclosure. The embedding model 402 and/or clustering model 404 can be implemented as a pre-processor of the inputs 408 for the primary model 406. The primary model 406 can be configured for a variety of tasks or applications, such as image classification, audio classification, speech recognition, object recognition, personal assistant applications, and/or any other suitable application for machine-learned models. The embedding model 402 can be trained to produce embeddings 409 that are useful as inputs to the primary model 406. For example, the computing system can be configured to receive the embedding 409 as an output of the machine-learned embedding model 402. In response to receiving the embedding 409, the primary model 406 can output a primary output 410 (e.g., a classification output, a recognition output, or other suitable output according to the purpose of the primary model 406).

A primary loss function can be used to evaluate the primary output 410 to produce a primary loss 412. The computing system can modify, parameters of the machine-learned embedding model 402 and/or the primary model 406 based on the primary loss 412 evaluated with respect to the primary output 410 of the primary model 406. The computing system can backpropagate the primary loss 412 through the primary model 406 (represented by arrow 414), with or without modification of the parameters (e.g., weights) of layers of the primary model 406. The computing system can continue to backpropagate the primary loss 412 through the embedding model 402, with or without modification of the parameters (e.g., weights) of the embedding model 402 (represented by dotted arrow 416).

As described above with respect to FIG. 3, the computing system can modify one or more parameters of one or both of the clustering model 404 and the embedding model 402 based on a clustering loss 418 evaluated with respect to the cluster assignment 420. The computing system can backpropagate the clustering loss 418 through the clustering model 404 (represented by arrow 422), with or without modification of the parameters (e.g., weights) of layers of the clustering model 404. The computing system can continue to backpropagate the clustering loss 418 through the embedding model 402. The computing system can modify the parameters of the embedding model 402 based on the clustering loss 418 (represented by dotted arrow 424).

The machine-learned embedding model 402 can be trained in multiple stages. For example, in a first training stage, the machine-learned embedding model 402 can be trained based on the clustering loss 418. In a second training stage, the machine-learned embedding model 402 can be trained based on the primary loss 412 that is evaluated with respect to the primary output 410 of the primary model 406. In another example, both of the clustering loss 418 and the primary loss 412 can be jointly and simultaneously evaluated and used to train the embedding model 402 and/or the other models. For example, a total loss function can be applied to the embedding model, where the total loss function is a sum (e.g., potentially with some scaling hyperparameter) or the primary loss 412 and the clustering loss 418. The primary loss function can be selected or configured such that the machine-learned embedding model 402 is trained to produce embeddings 409 that are useful as inputs to the primary model 406.

Figure 5:
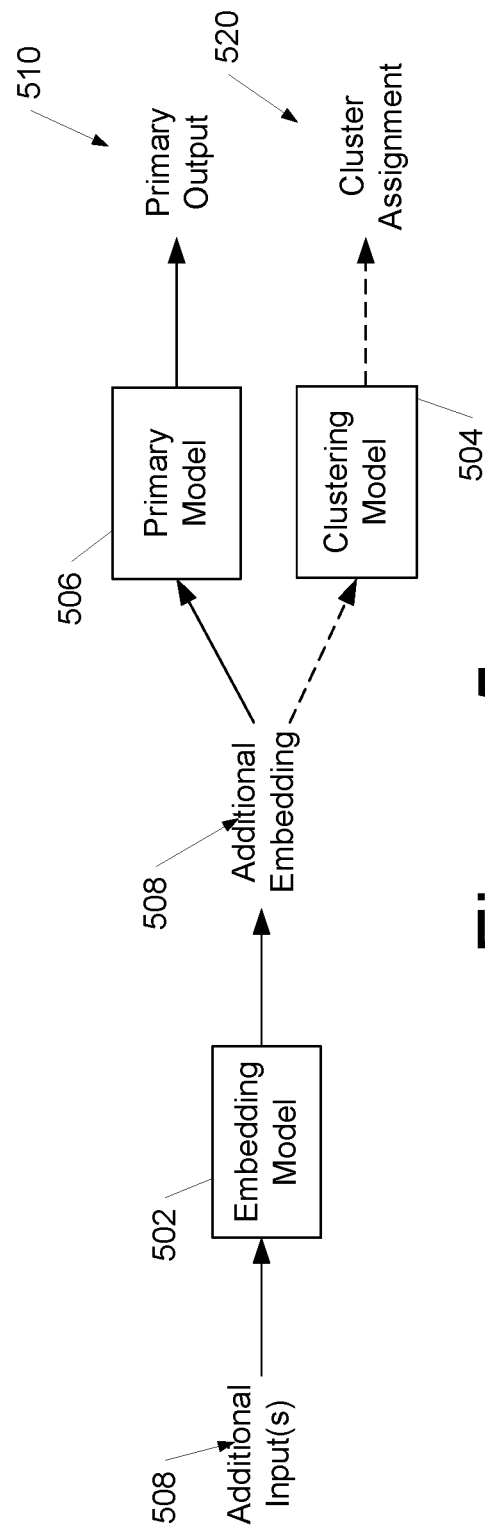
FIG. 5 depicts a block diagram of a computing system including an embedding model, a clustering model, and a primary model in which the models have been trained based on a primary loss and a clustering loss according to example embodiments of the present disclosure.

FIG. 5 depicts a block diagram of an example system 500 including an embedding model 502, and a primary model 506 at an inference time, according to example embodiments of the present disclosure. The additional input(s) 508 can be input into the embedding model 502, and the additional embeddings 508 can be input into the primary model 506 to obtain the primary output 510 (e.g., a classification output, a recognition output, or other suitable output according to the purpose of the primary model 406).

In some embodiments, the system 500 can further include a clustering model 504. The additional embedding 508 can be input into the clustering model 504 at the inference time. The additional cluster assignment 520 can be received as an output of the clustering model 504. The additional cluster assignment 520 can include useful information that can be used as an output of the system 500.

Employing the embedding model 502 in this configuration can reduce the amount of training iterations for the primary model 502 as compared with inputting raw input data into the primary model 506. Thus, the systems and method disclosed herein may reduce the computational resources required for training machine-learned models to perform a specific technical task, such as recognition and/or classification of images, video, audio, etc.

Example Methods

Figure 6:
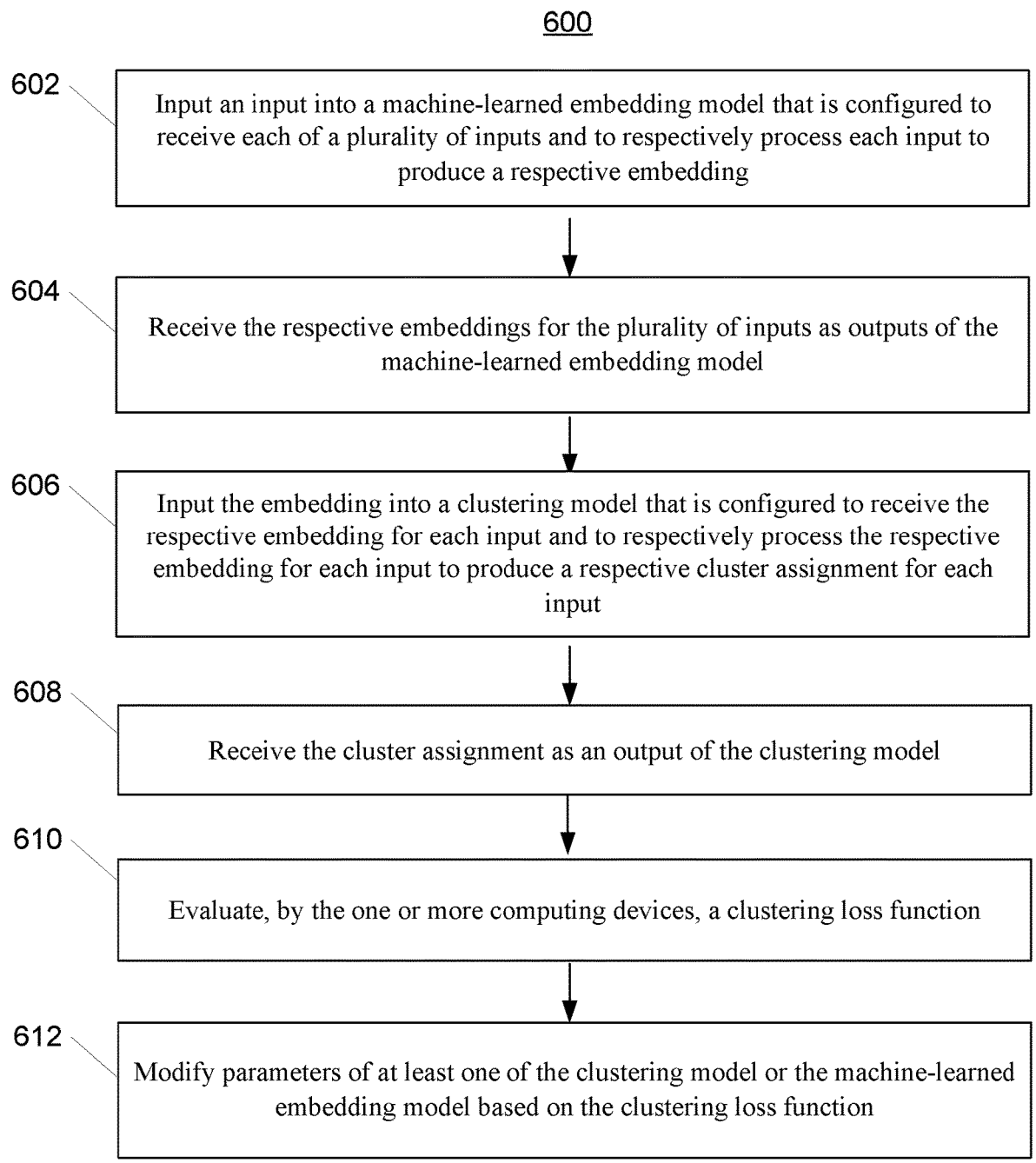
FIG. 6 depicts a flow chart diagram of an example method for training an embedding model and/or a clustering model based on a clustering loss function according to example.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can input an input into a machine-learned embedding model that is configured to receive each of a plurality of inputs and to respectively process each input to produce a respective embedding, for example as described above with reference to FIGS. 2 and 5.

At 604, the computing system can receive the respective embeddings for the plurality of inputs as outputs of the machine-learned embedding model, for example as described above with reference to FIGS. 2 and 5.

At 606, the computing system can input the embedding into a clustering model that is configured to receive the respective embedding for each input and to respectively process the respective embedding for each input to produce a respective cluster assignment for each input, for example as described above with reference to FIGS. 2 and 5.

At 608, the computing system can receive the cluster assignment as an output of the clustering model, for example as described above with reference to FIGS. 2 and 5.

At 610, the computing system can evaluate, by the one or more computing devices, a clustering loss function, for example as described above with reference to FIGS. 2 and 5.

At 612, the computing system can modify parameters of at least one of the clustering model or the machine-learned embedding model based on the clustering loss function, for example as described above with reference to FIGS. 2 and 5.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

Another example aspect of the present disclosure is directed to a computing system including one or more processors; an audio embedding model configured to receive audio data and, in response to receiving the audio data, produce an audio embedding comprising a plurality of audio data points; an image embedding model configured to receive image data and, in response to receiving the image data, produce an image embedding comprising a plurality of image data points: and a clustering model configured to receive data describing the audio embedding and to process the data describing the audio embedding audio embedding to produce a respective cluster assignment for each data point of the audio embedding. The respective cluster assignment for each data point of the audio embedding can include a respective probability distribution for the respective data point with respect to a plurality of clusters. The computing system can include one or more non-transitory computer-readable media that collectively store instructions that, when executed by the one or more processors, cause the computing system to perform operations. The operations can include inputting the audio data into the audio embedding model; receiving the audio embedding comprising the plurality of audio data points as outputs of the audio embedding model; inputting the image data into the image embedding model; receiving the image embedding comprising the plurality of image data points as outputs of the image embedding model; inputting data describing the audio embedding into the clustering model; receiving the respective cluster assignments for each data point of the audio embedding as outputs of the clustering model; evaluating a clustering loss function; and modifying one or more parameters of one or more of the clustering model, the audio embedding model, and the image embedding model based on the clustering loss function.

In some embodiments, the clustering loss function can evaluate a first average, across the plurality of audio data points of the audio embedding, of a respective first entropy of each respective probability distribution and a second entropy of a second average of the probability distributions for the plurality of audio data points of the audio embedding.

In some embodiments, the operations further can include modifying one or more parameters of each of the audio embedding model and the image embedding model based on the clustering loss function.

In some embodiments, the system can further include an audio-visual coincidence model configured to receive data describing each of the audio embedding and the image embedding and, in response to receiving the data describing each of the audio embedding and the image embedding, produce data that describes an audio-visual coincidence probability distribution between audio events described by the audio data and image events described by the image data. The operations can further include modifying one or more parameters of one or more of the audio-visual coincidence model, the audio embedding model, and the image embedding model based on an audio-visual coincidence loss function that evaluates a cross-entropy of the audio-visual coincidence probability distribution.

In some embodiments, the system can further include an audio-audio coincidence model configured to receive data describing the audio embedding, in response to receiving the data describing the audio embedding, produce data that describes an audio-audio coincidence probability distribution with respect to respective pairs of audio events described by the audio data, and wherein the operations further comprise modifying one or more parameters of one or more of the audio-audio coincidence model, the audio embedding model, and the image embedding model based on an audio-audio coincidence loss function that evaluates a cross-entropy with respect to the audio-audio coincidence probability distribution.

In some embodiments, the system can further include an audio-visual coincidence model configured to receive data describing each of the audio embedding and the image embedding and, in response to receiving the data describing each of the audio embedding and the image embedding, produce data that describes an audio-visual coincidence probability distribution between audio events described by the audio data and image events described by the image data; and an audio-audio coincidence model configured to receive data describing the audio embedding, in response to receiving the data describing the audio embedding, produce data that describes an audio-audio coincidence probability distribution with respect to respective pairs of audio events described by the audio data. The operations can further include, in a coincidence training phase: evaluating an audio-audio coincidence loss function that evaluates a cross-entropy with respect to the audio-audio coincidence probability distribution; evaluating an audio-visual coincidence loss function that evaluates a cross-entropy with respect to the audio-visual coincidence probability distribution; and modifying one or more parameters of the audio embedding model and the image embedding model based on a coincidence loss function that evaluates the audio-audio coincidence loss function and the audio-visual coincidence loss function. The operations can further include, before the coincidence training phase, modifying one or more parameters of the audio embedding model and the image embedding model based on the audio-visual coincidence loss function and not based on the audio-audio coincidence loss function.

In some embodiments, the system can further include a classifier network configured to receive data describing the audio embedding and, in response to receiving the data describing the audio embedding, produce a class probability distribution with respect to a plurality of class labels and audio events described by the audio data. The operations can further include: after the coincidence training phase, modifying one or more parameters of the audio embedding model and the image embedding model based on a joint supervised loss function that evaluates the coincidence loss function and the clustering loss function, wherein the clustering loss function evaluates: a first average, across the plurality of audio data points of the audio embedding, of a respective first entropy of each respective probability distribution; and a second entropy of a second average of the probability distributions for the plurality of audio data points of the audio embedding.

In some embodiments, the system can further include a classifier network configured to receive data describing the audio embedding and, in response to receiving the data describing the audio embedding, produce a class probability distribution with respect to a plurality of class labels and audio events described by the audio data, and wherein the operations further comprise, after the coincidence training phase, modifying one or more parameters of the classifier network based on a class loss function that evaluates a cross entropy between the class probability distribution and the plurality of class labels.

Another example aspect of the present disclosure is directed to a method for training one or more machine learned models. The method can include inputting audio data into an audio embedding model configured to receive audio data and, in response to receiving the audio data, produce an audio embedding comprising a plurality of audio data points; receiving the audio embedding comprising the plurality of audio data points as outputs of the audio embedding model; inputting image data into an image embedding model configured to receive the image data and, in response to receiving the image data, produce an image embedding comprising a plurality of image data points; receiving the image embedding comprising the plurality of image data points as outputs of the image embedding model; and inputting data describing the audio embedding into a clustering model configured to receive data describing the audio embedding and to process the data describing the audio embedding audio embedding to produce a respective cluster assignment for each data point of the audio embedding. The respective cluster assignment for each data point of the audio embedding can include a respective probability distribution for the respective data point with respect to a plurality of cluster. The method can include receiving the respective cluster assignments for each data point of the audio embedding as outputs of the clustering model; evaluating a clustering loss function; and modifying one or more parameters of one or more of the clustering model, the audio embedding model, and the image embedding model based on the clustering loss function.

In some embodiments, the clustering loss function evaluates: a first average, across the plurality of audio data points of the audio embedding, of a respective first entropy of each respective probability distribution; and a second entropy of a second average of the probability distributions for the plurality of audio data points of the audio embedding.

In some embodiments, the method can include modifying one or more parameters of each of the audio embedding model and the image embedding model based on the clustering loss function.

In some embodiments, the method can include modifying one or more parameters of one or more of an audio-visual coincidence model, audio embedding model, and the image embedding model based on an audio-visual coincidence loss function that evaluates a cross-entropy of the audio-visual coincidence probability distribution, wherein the audio-visual coincidence model is configured to receive data describing each of the audio embedding and the image embedding and, in response to receiving the data describing each of the audio embedding and the image embedding, produce data that describes an audio-visual coincidence probability distribution between audio events described by the audio data and image events described by the image data.

In some embodiments, the method can include modifying one or more parameters of one or more of an audio-audio coincidence model, the audio embedding model and the image embedding model based on an audio-audio coincidence loss function that evaluates a cross-entropy with respect to the audio-audio coincidence probability distribution. The audio-audio coincidence model can be configured to receive data describing the audio embedding, in response to receiving the data describing the audio embedding, produce data that describes an audio-audio coincidence probability distribution with respect to respective pairs of audio events described by the audio data.

In some embodiments, the method can further include inputting data describing each of the audio embedding and the image embedding into an audio-visual coincidence model configured to receive the data describing each of the audio embedding and the image embedding and, in response to receiving the data describing each of the audio embedding and the image embedding, produce data that describes an audio-visual coincidence probability distribution between audio events described by the audio data and image events described by the image data; receiving the data that describes the audio-visual coincidence probability distribution as an output of the audio-visual coincidence model; inputting data describing the audio embedding into an audio-audio coincidence model configured to receive data describing the audio embedding, and in response to receiving the data describing the audio embedding, produce data that describes an audio-audio coincidence probability distribution with respect to respective pairs of audio events described by the audio data; and receiving data that describes the audio-audio coincidence probability distribution with respect to the respective pairs of the audio events described by the audio data as an output of the audio-audio coincidence model.

In some embodiments, the method can further include, in a coincidence training phase, evaluating an audio-audio coincidence loss function that evaluates a cross-entropy with respect to the audio-audio coincidence probability distribution; evaluating an audio-visual coincidence loss function that evaluates a cross-entropy with respect to the audio-visual coincidence probability distribution; and modifying one or more parameters of the audio embedding model and the image embedding model based on a coincidence loss function that evaluates the audio-audio coincidence loss function and the audio-visual coincidence loss function.

In some embodiments, the method can further include, before the coincidence training phase, modifying one or more parameters of the audio embedding model and the image embedding model based on the audio-visual coincidence loss function and not the audio-audio coincidence loss function.

In some embodiments, the method can further include inputting data describing the audio embedding into a classifier network configured to receive the data describing the audio embedding and, in response to receiving the data describing the audio embedding, produce a class probability distribution with respect to a plurality of class labels and audio events described by the audio data; and receiving the class probability distribution as an output of the classifier network.

In some embodiments, the method can further include, after the coincidence training phase, modifying one or more parameters of the audio embedding model and the image embedding model based on a joint supervised loss function that evaluates the coincidence loss function and a clustering loss function, wherein the clustering loss function evaluates: a first average, across the plurality of audio data points of the audio embedding, of a respective first entropy of each respective probability distribution; and a second entropy of a second average of the probability distributions for the plurality of audio data points of the audio embedding.

In some embodiments, the method can further include inputting data describing the audio embedding into a classifier network configured to receive and, in response to receiving the data describing the audio embedding, produce a class probability distribution with respect to a plurality of class labels and audio events described by the audio data, and wherein the operations further comprise: receiving the class probability distribution as an output of the classifier network; and after the coincidence training phase: modifying one or more parameters of the classifier network based on a class loss function that evaluates a cross entropy between the class probability distribution and the plurality of class labels.

Another example aspect of the present disclosure is directed to a computing system including one or more processors; an audio-visual coincidence model configured to receive data describing each of the audio embedding and the image embedding and, in response to receiving the data describing each of the audio embedding and the image embedding, produce data that describes an audio-visual coincidence probability distribution between audio events described by the audio data and image events described by the image data; an audio embedding model configured to receive audio data and, in response to receiving the audio data, produce an audio embedding comprising a plurality of audio data points; an image embedding model configured to receive image data and, in response to receiving the image data, produce an image embedding comprising a plurality of image data points: and one or more non-transitory computer-readable media that collectively store instructions that, when executed by the one or more processors, cause the computing system to perform operations. The operations can include inputting the audio data into the audio embedding model; receiving, as an output of the audio embedding model, the audio embedding comprising the plurality of audio data points as outputs of the audio embedding model; inputting the image data into the image embedding model; receiving, as an output of the image embedding model, the image embedding comprising the plurality of image data points as outputs of the image embedding model; inputting data describing the audio embedding and the image embedding into the audio-visual coincidence model; receiving, as an output of the audio-visual coincidence model, data that describes the audio-visual coincidence probability distribution; evaluating a coincidence loss function. The coincidence loss function can evaluate an audio-audio coincidence loss function that evaluates a cross-entropy with respect to the audio-audio coincidence probability distribution; an audio-visual coincidence loss function that evaluates a cross-entropy with respect to the audio-visual coincidence probability distribution; and modifying one or more parameters of one or more of the audio embedding model and the image embedding model based on the coincidence loss function.

In some embodiments, the computing system can further include a clustering model configured to receive data describing the audio embedding and to process the data describing audio embedding to produce a respective cluster assignment for each data point of the audio embedding, wherein the respective cluster assignment for each data point of the audio embedding comprises a respective probability distribution for the respective data point with respect to a plurality of clusters; wherein the operations further include: evaluating a clustering loss function that evaluates: a first average, across the plurality of audio data points of the audio embedding, of a respective first entropy of each respective probability distribution; and a second entropy of a second average of the probability distributions for the plurality of audio data points of the audio embedding. The operations can further include modifying one or more parameters of one or more of the clustering model, the audio embedding model, and the image embedding model based on the clustering loss function.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors;
   an embedding model configured to receive each of a plurality of inputs and to respectively process each input to produce a respective embedding;
   a clustering model configured to receive the respective embedding for each input and to respectively process the respective embedding for each input to produce a respective cluster assignment for each input, wherein the respective cluster assignment for each input comprises a respective probability distribution for the respective embedding with respect to a plurality of clusters:
   one or more non-transitory computer-readable media that collectively store instructions that, when executed by the one or more processors, cause the computing system to perform operations, the operations comprising:
     inputting each of the plurality of inputs into the embedding model;
     receiving the respective embeddings for the plurality of inputs as outputs of the embedding model;
     inputting the respective embeddings for the plurality of inputs into the clustering model;
     receiving the respective cluster assignments for the plurality of inputs as outputs of the clustering model;
     evaluating a clustering loss function that evaluates:
       a first average, across the plurality of inputs, of a respective first entropy of each respective probability distribution; and
       a second entropy of a second average of the probability distributions for the plurality of inputs; and
     modifying one or more parameters of one or both of the clustering model and the embedding model based on the clustering loss function.

2. The computing system of claim 1, wherein the clustering loss function provides a loss value that is positively correlated with the first average and negatively correlated with the second entropy.

3. The computing system of claim 1, wherein modifying parameters of at least one of the clustering model or the embedding model based on the clustering loss function comprises modifying respective parameters of each of the clustering model and the embedding model based on the clustering loss function.

4. The computing system of claim 1, wherein modifying parameters of at least one of the clustering model or the embedding model based on the clustering loss function comprises modifying parameters of the clustering model and holding parameters of the embedding model constant.

5. The computing system of claim 1, wherein the second entropy is scaled by a diversity hyperparameter.

6. The computing system of claim 1, wherein the cluster assignment that describes the mapping of the embedding with respect to the plurality of clusters describes respective centroids of the plurality of clusters.

7. The computing system of claim 1, wherein the cluster assignment that describes the mapping of the embedding with respect to the plurality of clusters comprises an encoding of respective elements of the input with respect to one or more of the plurality of, clusters.

8. The computing system of claim 1, further comprising a machine-learned primary model configured to receive the embedding, and in response to receiving the embedding, output a primary output, and wherein the operations further comprise modifying parameters of the embedding model based on a primary loss function evaluated with respect to the primary output of the machine-learned primary model.

9. The computing system of claim 1, wherein the operations further comprise, at an inference time, inputting an input into the embedding model, and receiving the embedding as an output of the embedding model.

10. A computing system comprising:
one or more processors;
an embedding model configured to receive each of a plurality of inputs and to respectively process each input to produce a respective embedding;
a clustering model configured to receive the respective embedding for each input and to respectively process the respective embedding for each input to produce a respective cluster assignment for each input, wherein the respective cluster assignment for each input comprises a respective probability distribution for the respective embedding with respect to a plurality of clusters, and wherein at least one of the embedding model or the clustering model has been trained based on a clustering loss function that comprises:
  a first average, across the plurality of inputs, of a respective first entropy of each respective probability distribution; and
  a second entropy of a second average of the probability distributions for the plurality of inputs;
one or more non-transitory computer-readable media that collectively store instructions that, when executed by the one or more processors, cause the computing system to perform operations, the operations comprising:
inputting an additional input into the embedding model;
receiving an additional embedding as an output of the embedding model, the additional embedding generated by the embedding model by processing the additional input;
inputting the additional embedding into the clustering model; and
receiving an additional cluster assignment as an output of the clustering model, the additional cluster assignment generated by the clustering model by processing the additional embedding.

11. The computing system of claim 10, wherein the clustering loss function provides a loss value that is positively correlated with the first average and negatively correlated with the second entropy.

12. The computing system of claim 10, wherein the second entropy is scaled by a diversity hyperparameter.

13. The computing system of claim 10, wherein the cluster assignment that describes the mapping of the embedding with respect to the plurality of clusters describes respective centroids of the plurality of clusters.

14. The computing system of claim 10, wherein the additional cluster assignment describes an additional mapping of the additional embedding with respect to an additional plurality of clusters and comprises an encoding of respective elements of the additional input with respect to one or more of the additional plurality of clusters.

15. The computing system of claim 10, further comprising a machine-learned primary model configured to receive the embedding, and in response to receiving the embedding, output a primary output, and wherein the operations further comprise modifying parameters of the embedding model based on a primary loss function evaluated with respect to the primary output of the machine-learned primary model.

16. A method for training one or more machine learned models, the method comprising:
inputting, by one or more computing devices, each of a plurality of inputs into an embedding model that is configured to respectively process each input to produce a respective embedding;
receiving, by the one or more computing devices, the respective embeddings for the plurality of inputs as outputs of the embedding model;
inputting, by the one or more computing devices, the embeddings of the plurality of inputs into a clustering model that is configured to receive the respective embedding for each input and to respectively process the respective embedding for each input to produce a respective cluster assignment for each input, wherein the respective cluster assignment for each input comprises a respective probability distribution for the respective embedding with respect to a plurality of clusters;
receiving, by the one or more computing devices, the cluster assignment as an output of the clustering model;
evaluating, by the one or more computing devices, a clustering loss function that comprises:
  a mean per-example entropy that comprises a first average, across the plurality of inputs, of a respective entropy of each respective probability distribution; and
  a batch average distribution entropy of a second average of the probability distributions for the plurality of inputs; and
modifying, by the one or more computing devices, parameters of at least one of the clustering model or the embedding model based on the clustering loss function.

* * * * *